United States Patent
Hatakeyama et al.

(10) Patent No.: US 10,628,488 B2
(45) Date of Patent: Apr. 21, 2020

(54) DOCUMENT RETRIEVAL SYSTEM AND RETRIEVAL METHOD

(71) Applicant: HITACHI, LTD., Tokyo (JP)

(72) Inventors: Atsushi Hatakeyama, Tokyo (JP); Michio Iijima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 504 days.

(21) Appl. No.: 15/507,296

(22) PCT Filed: Mar. 27, 2015

(86) PCT No.: PCT/JP2015/059783
§ 371 (c)(1),
(2) Date: Feb. 28, 2017

(87) PCT Pub. No.: WO2016/157336
PCT Pub. Date: Oct. 6, 2016

(65) Prior Publication Data
US 2017/0277809 A1  Sep. 28, 2017

(51) Int. Cl.
*G06F 16/31* (2019.01)
*G06F 16/901* (2019.01)
(Continued)

(52) U.S. Cl.
CPC ........ *G06F 16/9017* (2019.01); *G06F 16/285* (2019.01); *G06F 16/31* (2019.01);
(Continued)

(58) Field of Classification Search
CPC .. G06F 16/31; G06F 16/328; G06F 16/90344; G06F 16/285; G06F 16/1744; Y10S 707/99942
(Continued)

(56) References Cited

U.S. PATENT DOCUMENTS

| 2012/0096003 A1* | 4/2012 | Motohashi | G06F 16/35 707/737 |
| 2013/0238865 A1* | 9/2013 | Kataoka | G06F 12/00 711/154 |
| 2018/0260469 A1* | 9/2018 | Paris | G06F 21/602 |

FOREIGN PATENT DOCUMENTS

WO  2013/069149 A1  5/2013

\* cited by examiner

*Primary Examiner* — Marcin R Filipczyk
(74) *Attorney, Agent, or Firm* — Volpe and Koenig, P.C.

(57) ABSTRACT

A document retrieval system includes a storage device and a retrieval server. The storage device stores document data including documents compressed so as to correspond to a plurality of divided document groups, indexes indicating correspondence relations between partial character strings for retrieving the documents and first identifiers indicating the documents, and a first correspondence table in which the document groups are divided into document small groups, and second identifiers which indicate the document small groups correspond to the partial character strings. The retrieval server retrieves, in response to an input of a retrieval character string, a second identifier corresponding to a partial character string included in the retrieval character string, from the first correspondence table, decompresses document data in a document group, retrieves a first identifier corresponding to the partial character string, obtains document data corresponding to the retrieved first identifier, and outputs the retrieved first identifier.

8 Claims, 6 Drawing Sheets

(51) Int. Cl.
*G06F 16/93* (2019.01)
*G06F 16/903* (2019.01)
*G06F 16/33* (2019.01)
*G06F 16/28* (2019.01)

(52) U.S. Cl.
CPC ........ *G06F 16/328* (2019.01); *G06F 16/3331* (2019.01); *G06F 16/90344* (2019.01); *G06F 16/93* (2019.01)

(58) Field of Classification Search
USPC .............................................. 707/736, 953
See application file for complete search history.

| n-gram | SMALL GROUP ID |
|---|---|
| Hig | 1,3,14,68,89,104 |
| kin | 54,180,753,1756 |
| ... | **, **, **, **, |

| RETRIEVAL CHARACTER STRING | DOCUMENT ID |
|---|---|
| ... | ... |
| history | 68,194,287... |

DOCUMENT RETRIEVAL SYSTEM AND RETRIEVAL METHOD

TECHNICAL FIELD

The present invention relates to a document retrieval system and a retrieval method for large-capacity document data.

BACKGROUND ART

As the capacity of document data increases, a demand for a document retrieval system for large-capacity document data increases. In order to respond to the increase in the capacity of document data, a retrieval device that divides document data into units suitable for a character string retrieval, sets a character string retrieval index in each unit, narrows down a retrieval target in divided document data units based on a retrieval condition, and retrieves an index in the narrowed document data using a character string included in the retrieval condition is disclosed in PTL 1.

CITATION LIST

Patent Literature
   PTL 1: WO 2013/069149 A1

SUMMARY OF INVENTION

Technical Problem

The increase in the capacity of the document data which the document retrieval system regards as a retrieval target reaches a capacity on the order of petabyte (PByte), and it is requested to compress document data of a retrieval target and minimize an increase in a storage capacity for storing document data. In other words, there is a demand for a document retrieval system in which compressed document data is a retrieval target.

Compressed document data may be decompressed, and decompressed document data may be a retrieval target, but since the capacity of the decompressed document data comes back to the original, the compression is meaningless, and a retrieval period of time also increases depending on the capacity of document data.

Solution to Problem

A document retrieval system according to the disclosure includes a storage device that stores an index indicating a correspondence relation among document data including a document which is divided into a plurality of document groups and compressed in association with the document groups, a partial character string used for retrieving the document, and a first identifier indicating the document and a first correspondence table in which the document group is divided into small document groups including at least one document, and a second identifier indicating the small document group is associated with the partial character string and a retrieval server that retrieves, in response to an input of a retrieval character string, the second identifier corresponding to the partial character string included in the retrieval character string from the first correspondence table, decompresses the document data of the document group including the small document group indicated by the second identifier, retrieves the first identifier corresponding to the partial character string in which the second identifier is retrieved with reference to the index, acquires the document data corresponding to the retrieved first identifier from the decompressed document data, retrieves the first identifier of the document data including the retrieval character string in the acquired document data, and output the retrieved first identifier.

Advantageous Effects of Invention

According to the document retrieval system of the disclosure, the retrieval period of time can be reduced using compressed document data as the retrieval target.

DESCRIPTION OF EMBODIMENTS

An overview of a document retrieval system will be described. The document retrieval system is a system that specifies a document including a retrieval character string serving as a retrieval condition based on document data including a plurality of documents. When it is possible to specify a document, it is possible to output a specified document in a form convenient to a user of the document retrieval system using a known technique.

The document retrieval system prepares the following (1) to (4) and stores them in a storage device in advance when document data is registered in a document database.

(1) The document retrieval system divides large-capacity document data including a document of a record unit into a plurality of document groups, compresses each document group, and stores the compressed document groups in the document database.

(2) The document retrieval system further divides the document group into small document groups, and generates a correspondence table of the small document group and the document group. The correspondence table indicates that the small document groups are included in the document group.

(3) The document retrieval system generates a correspondence table (an n-gram hit list) of a partial character string (n-gram) for document retrieval and a small document group including the partial character string. The correspondence table (n-gram hit list) indicates that the partial character string is included in any one of the documents included in the small document group.

(4) The document retrieval system generates a correspondence table (index) of the partial character string (n-gram) and a document in units of small document groups. The correspondence table (index) indicates that the partial character string is included in the document.

Practically, it is desirable that the document retrieval system perform the preparation at the time of registration in an opposite order (an in order of (4) to (1)) to the above-described order. In other words, the document retrieval system generates the correspondence table (index) in association with a document to be registered in the document database, generates the small document group by adding several documents, generates a correspondence table (n-gram hit list) by performing a logical sum (OR) of the partial character strings of the correspondence table (index), generates the document group by adding several small document groups, generates the correspondence table of the small document group and the document group, compresses the documents included in the document group collectively, and stores the compressed documents in the document database.

At the time of retrieval, in response to an input of the retrieval character string, the document retrieval system retrieves the small document group corresponding to the partial character string included in the retrieval character string with reference to the n-gram hit list, retrieves the document group corresponding to the retrieved small document group with reference to the correspondence table of the small document group and the document group, retrieves a document corresponding to the partial character string in which the small document group is retrieved with reference to the index, and outputs the document group retrieved as the document group of the decompression target and the document retrieved as a retrieval result document.

The document data of the document group depends on a compression technique but has a capacity in which a compression rate of document data is high (a compression ratio is high). Further, the document data of the small document group has a capacity in which retrieval efficiency of the document retrieval using the partial character string (n-gram) for the document retrieval is good (the retrieval period of time is short). Generally, the compression rate of the document data is as high as several MBytes, and the retrieval efficiency is as high as several Kbytes, and they are incomparable capacities. In this regard, the document retrieval system uses the document group and the small document group corresponding to a data capacity which is desirable for each of the compression and the retrieval of the document data.

In the following description, in order to facilitate understanding of description made with reference to the drawings, each correspondence table is given a name, and an identifier (ID) is further allocated to a document or the like. The correspondence table (index) of the partial character string and the document ID is referred to as an index, the correspondence table (the n-gram hit list) of the partial character string and the small document group ID (hereinafter, a small group ID) is referred to as an n-gram hit list, and the correspondence table of the small group ID and the document group ID (hereinafter, a group ID) is referred to as a group list.

Figure 1:
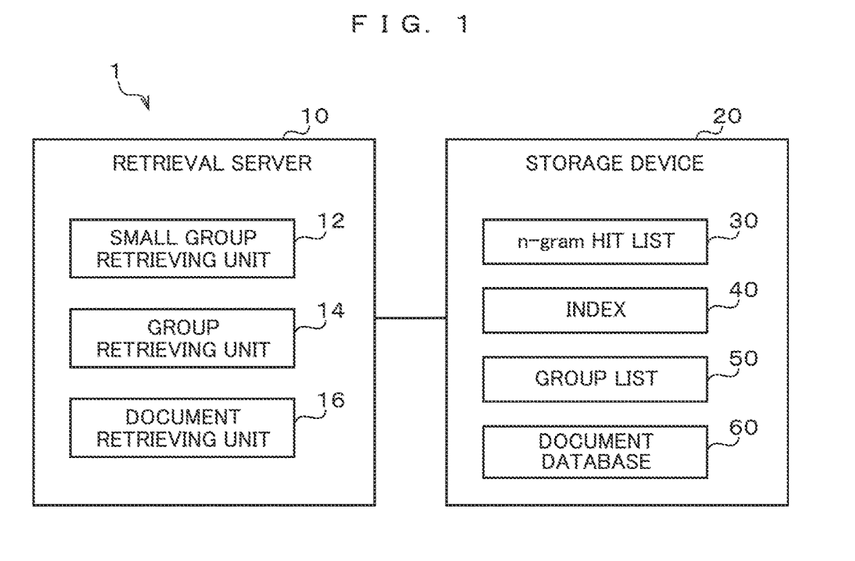
FIG. 1 is an exemplary configuration illustrating a document retrieval system.

FIG. 1 is an exemplary configuration illustrating a document retrieval system 1. The document retrieval system 1 is implemented on a common computer system in which a retrieval server 10 is connected with a storage device 20. Thus, for example, a CPU, a memory, and an input/output device included in the retrieval server 10 are not illustrated but are used for description as necessary.

The retrieval server 10 includes a small group retrieving unit 12, a group retrieving unit 14, and a document retrieving unit 16. The processing units are described as being installed independently in order to facilitate understanding but are preferably installed as a series of processing units executed by the retrieval server 10. Each processing unit is described after a description related to the storage device 20.

The storage device 20 includes an n-gram hit list 30, an index 40, a group list 50, and a document database 60 that stores compressed document data.

Figure 2:
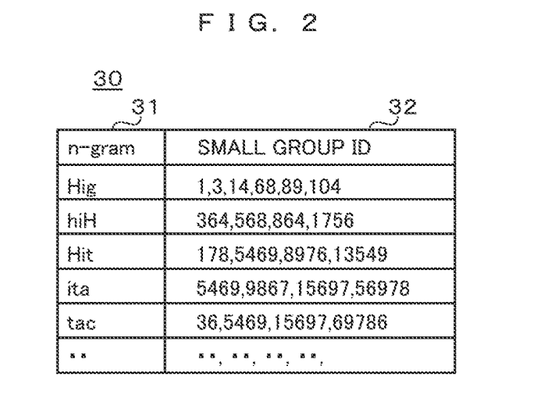
FIG. 2 is an exemplary configuration illustrating an n-gram hit list.

FIG. 2 is an exemplary configuration illustrating the n-gram hit list 30. The n-gram hit list 30 is a correspondence table of a partial character string n-gram 31 for retrieval and a small group ID 32 and indicates that the n-gram 31 of the n-gram hit list 30 is included in the document included in the small document group of the small group ID 32. In an example of FIG. 2, the n-gram 31 of "Hig" is included in the documents included in the small document groups of the small group ID 32 of "1," "3," "14," "68," "89," and "104."

Figure 3:
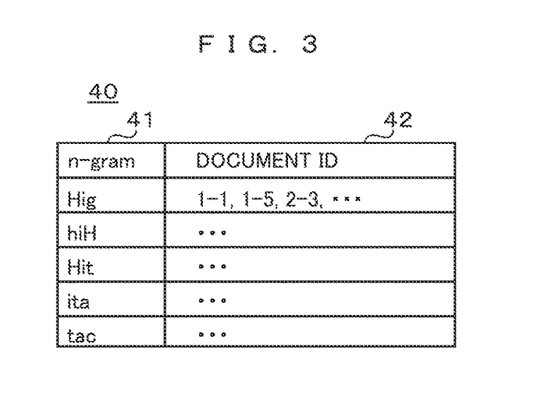
FIG. 3 is an exemplary configuration illustrating an index.

FIG. 3 is an exemplary configuration illustrating the index 40. The index 40 is a correspondence table of an n-gram 41 and a document ID 42 and indicates that the n-gram 41 of the index 40 is included in the document of the document ID 42. In an example of FIG. 3, the n-gram 41 of "Hig" is included in the documents of the document IDs 42 of "1-1," "1-5," "2-3," and the like.

One index 40 may be installed in the document retrieval system 1, but it is desirable that the index 40 be installed for a document included in the document group or the small document group for each document group or each small document group from a point of view of a process of the document retrieval system 1 which will be described later.

Figure 4:
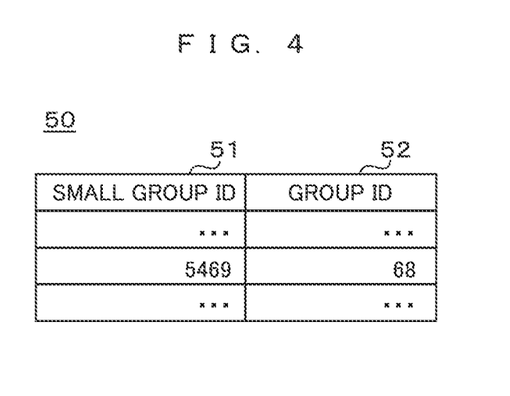
FIG. 4 is an exemplary configuration illustrating a group list.

FIG. 4 is an exemplary configuration illustrating the group list 50. The group list 50 is a correspondence table of a small group ID 51 and a group ID 52 and indicates that the small document group of the small group ID 51 is included in the document group of the group ID 52. In an example of FIG. 4, the small document group of the small group ID 51 of "5469" is included in the document group of the group ID 52 of "68." FIG. 4 illustrates an example of a one-to-one correspondence of the small group ID 51 and the group ID 52 of the group list 50, but the small group ID 51 and the group ID 52 of the group list 50 may have an m-to-one correspondence, where m indicates the number of small document groups included in the document group.

Figure 5:
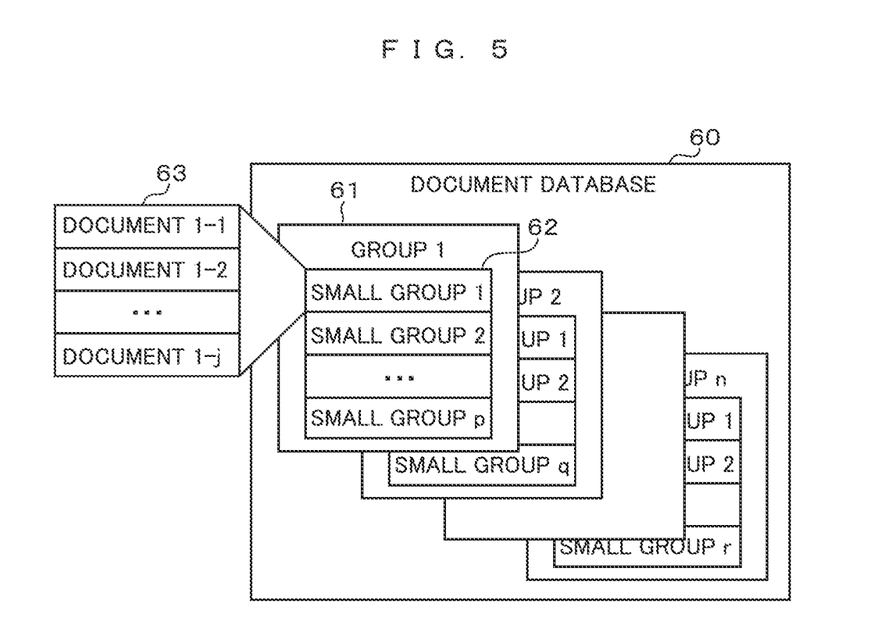
FIG. 5 is an exemplary configuration illustrating a document database.

FIG. 5 is an exemplary configuration illustrating the document database 60. The document database 60 compresses document data of several document groups 61 in units of document groups and stores the compressed document data. In FIG. 5, the document database 60 stores n document groups 61. Each of the document groups includes several small document groups 62, and each of the small document groups includes several documents 63. Further, each of the document groups 61, each of the small document groups 62, and each of the documents 63 in the document database 60 are specified by the group ID, the small group ID, and the document ID, respectively.

Figure 6:
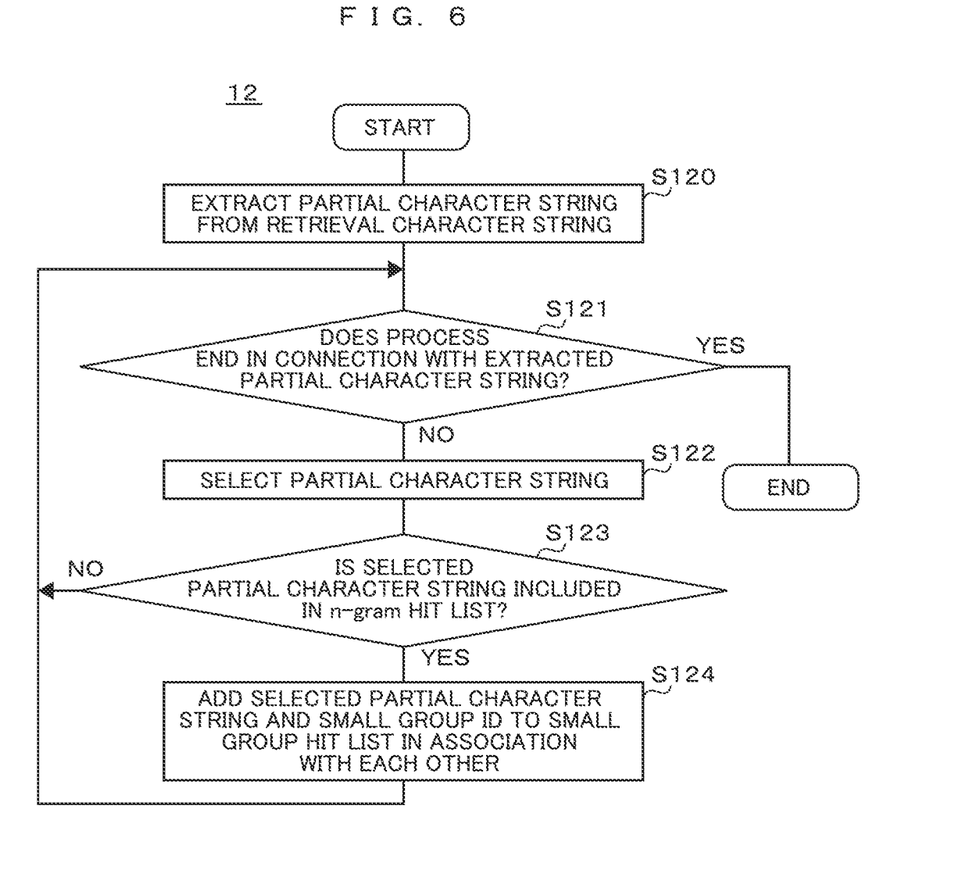
FIG. 6 is a flowchart illustrating a process of a small group retrieving unit.

FIG. 6 is a flowchart illustrating a process of the small group retrieving unit 12. The small group retrieving unit 12 extracts the partial character string (n-gram) from the retrieval character string (S120). In the n-gram retrieval, the partial character string (n-gram) of n consecutive characters in the retrieval character string is extracted from the retrieval character string. When the retrieval character string includes p (p=n or more) characters, (p−n+1) partial character strings are extracted. The small group retrieving unit 12 determines whether or not the following process (S122 to S124) ends in connection with the (p−n+1) extracted partial character strings (S121), and when the process ends, the small group retrieving unit 12 ends the process.

The small group retrieving unit 12 sequentially selects one of the (p−n+1) extracted partial character strings (S122). The small group retrieving unit 12 determines whether or not the selected partial character string is included in the n-gram of the n-gram hit list 30 (S123), and when no selected partial character string is included, the small group retrieving unit 12 causes the process to return to S121. When the selected partial character string is included, the small group retrieving unit 12 adds the selected partial character string and the small group ID to the small group hit list with association with each other (S124), and causes the process to return to S121.

Figure 7:
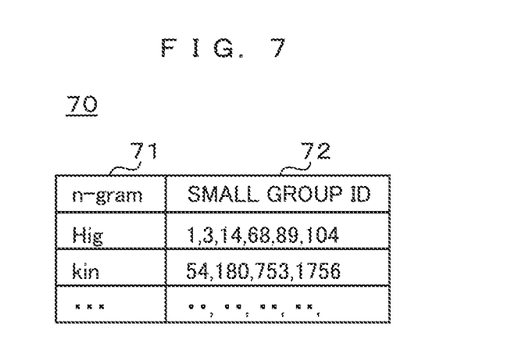
FIG. 7 is an exemplary configuration illustrating a small group hit list.

FIG. 7 is an exemplary configuration illustrating a small group hit list 70. The small group retrieving unit 12 generates the small group hit list 70 in the memory of the retrieval server 10. A configuration including a correspondence relation of a partial character string (n-gram) 71 and a small group ID of the small group hit list 70 is the same as the configuration of the n-gram hit list 30. They have the same configuration because when the selected partial character string is included in the n-gram of the n-gram hit list 30, the small group retrieving unit 12 copies a corresponding row from the n-gram hit list 30 and adds the row to the small group hit list 70. Thus, the list has a capacity in which the number of rows of the small group hit list 70 does not exceed p−n+1.

Figure 8:
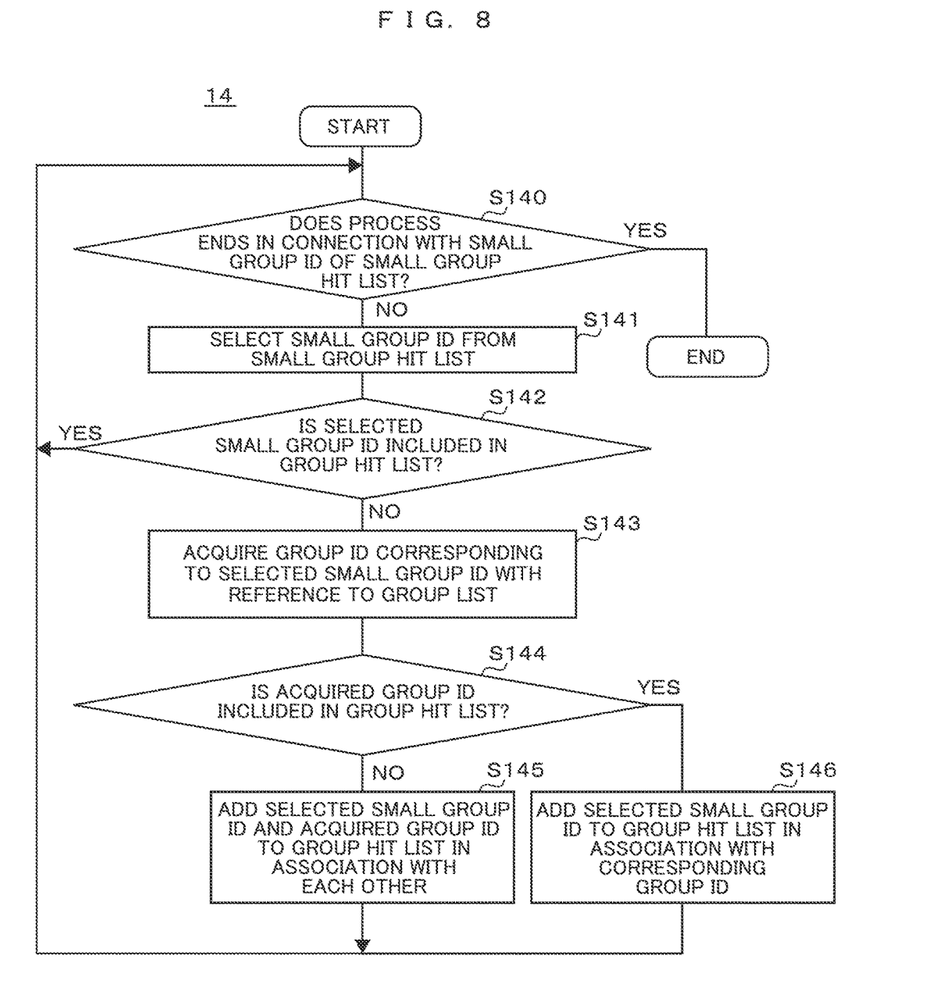
FIG. 8 is a flowchart illustrating a process of a group retrieving unit.

FIG. 8 is a flowchart illustrating a process of the group retrieving unit 14. The group retrieving unit 14 determines whether or not the following process (S141 to S146) ends in connection with the small group ID 72 included in the small group hit list 70 (S140), and when the process ends, the group retrieving unit 14 ends the process.

When the process does not end, the group retrieving unit 14 sequentially selects one of the small group IDs 72 included in the small group hit list 70 (S141). It is determined whether or not the selected small group ID 72 is included in the group hit list (S142).

Figure 9:
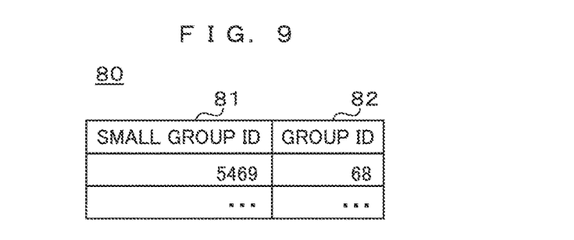
FIG. 9 is an exemplary configuration illustrating a group hit list.

FIG. 9 is an exemplary configuration illustrating a group hit list 80. The group retrieving unit 14 generates the group hit list 80 in the memory of the retrieval server 10. The group hit list 80 is a correspondence table of a small group ID 81 and a group ID 82. A configuration including a correspondence relation of the small group ID 81 and the group ID 82 of the group hit list 80 is the same as the group list 50. They have the same configuration because the group ID 52 corresponding to the small group ID 51 equivalent to the selected small group ID is acquired with reference to the group list 50, and the acquired group ID 52 is stored as the group ID 82 using the selected small group ID 72 as the small group ID 81.

Referring back to FIG. 8, the description is continued. When the selected small group ID 72 is included in the group hit list 80, the group retrieving unit 14 causes the process to return to S140. The selected small group ID 72 is included in the group hit list 80 when the same small group ID 72 corresponds to the different partial character strings (n-grams) of the small group hit list 70. In this case, since the correspondence relation between the small group ID 81 and the group ID 82 is included in the group hit list 80, the group retrieving unit 14 ends the process related to the selected small group ID 72, and causes the process to return to S140.

The group retrieving unit 14 acquires the group ID 52 corresponding to the small group ID 51 equivalent to the selected small group ID 72 with reference to the group list 50 (S143). The group retrieving unit 14 determines whether or not the acquired group ID 52 is stored in the group hit list 80 as the group ID 82 (S144). When the acquired group ID 52 is not stored in the group hit list 80 as the group ID 82, the group retrieving unit 14 additionally stores the correspondence relation between the selected small group ID 72 and the acquired group ID 52 as the correspondence relation between the small group ID 81 and the group ID 82 (S145), and causes the process to return to S140.

On the other hand, when the acquired group ID 52 is stored in the group hit list 80 as the group ID 82, the group retrieving unit 14 associates the group ID 52 with the group ID 82 which is already stored, and stores the selected small group ID 72 in the group hit list 80 as the small group ID 81 (S146), and causes the process to return to S140. The acquired group ID 52 is stored in the group hit list 80 as the group ID 82 when small document groups 62 of a plurality of different small group ID 72 of the small group hit list 70 are included in a document group 61 of a certain group ID 82.

Through the above process, the group retrieving unit 14 can generate the group hit list 80 in which the group IDs 52 corresponding to the small group IDs 72 of the small group hit list 70 are included not to overlap. The group ID 82 included in the group hit list 80 indicates the document group 61 in a compression unit of document data and indicates the document group 61 of document data to be decompressed.

Figure 10:
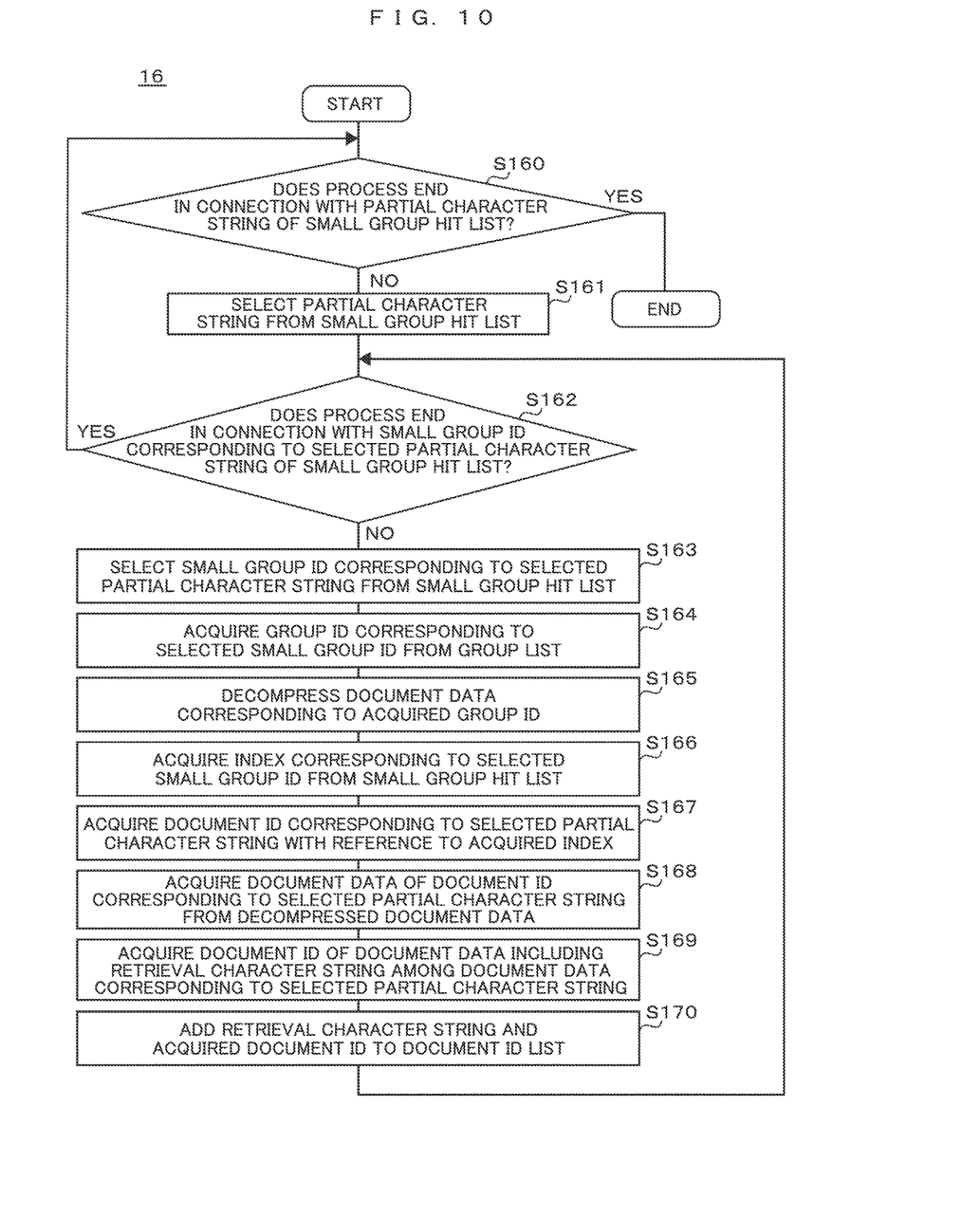
FIG. 10 is a flowchart illustrating a process of a document retrieving unit.

FIG. 10 is a flowchart illustrating a process of the document retrieving unit 16. Here, the index 40 is installed for a document 63 included in the small document group 62 for each the small document group 62.

The document retrieving unit 16 determines whether or not the following process (S161 to S170) ends in connection with the partial character string 71 of the small group hit list 70 (S160), and when the process ends, the document retrieving unit 16 causes the process to end. When the process does not end, the document retrieving unit 16 sequentially selects one of the partial character strings 71 of the small group hit list 70 (S161). The document retrieving unit 16 determines whether or not the following process (S163 to S170) ends in connection with the small group ID 72 corresponding to the selected partial character string 71 of the small group hit list 70 (S162), and when the process ends, the document retrieving unit 16 causes the process to return to S160.

When the process does not end, the document retrieving unit sequentially selects one of the small group IDs 72 corresponding to the selected partial character string 71 from the small group hit list 70 (S163). The document retrieving unit 16 acquires the group ID 82 corresponding to the selected small group ID 72 from the group hit list 80 (S164). The document data corresponding to the acquired group ID 82 is decompressed (S165). The document retrieving unit 16 acquires the index 40 corresponding to the selected small group ID 72 from the small group hit list 70 (S166), and acquires the document ID 42 corresponding to the selected partial character string 71 of the small group hit list 70 with reference to the acquired index 40 (S167). The document retrieving unit 16 acquires the document data of the document ID 42 corresponding to the selected partial character string 71 from the decompressed document data (S168). The document retrieving unit 16 acquires the document ID 42 of the document data including the retrieval character string among the document data of the document ID 42 corresponding to the selected partial character string 71 (S169). The document retrieving unit 16 adds the retrieval character string and the acquired document ID 42 to the document ID list (S170), and causes the process to return to S162.

Figure 11:
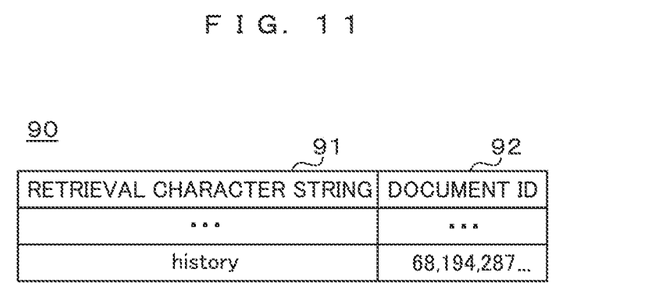
FIG. 11 is an exemplary configuration illustrating a document ID list.

FIG. 11 is an exemplary configuration illustrating a document ID list 90. The document retrieving unit 16 generates the document ID list 90 in association with the retrieval character string 91, and stores the document ID list 90 in the memory of the retrieval server 10. The document ID list 90 is a correspondence table of the retrieval character string 91 and a document ID 92 of a document including the retrieval character string 91, and the document retrieving unit 16 associates the retrieval character string with the acquired document ID 42 and stores the retrieval character string and the acquired document ID 42 in the document ID list 90 as the retrieval character string 91 and the document ID 92.

The above-described document retrieval system outputs the document ID list 90 which is generated in association with the small document group 62. The document retrieval system causes the document 63 specified by the document ID 92 of the document ID list 90 to be output on a display device of the retrieval server 10 as a subsequent process. Further, the document retrieval system displays the retrieval character string included in the document which is a combination of one or more of the partial character strings (n-grams) in a different form (display in a color, a character size, or a font which is different, reversed display, underline display, bright display, or the like) in the document output on the display device. Further, when a storage position of a decompressed document corresponding to a document group is included in the index 40, the document retrieval system can output the document ID and the storage position of the document 63 indicated by the retrieved document ID in the document group 60 as the retrieval result document with reference to the index 40. Such a subsequent process can be performed by a known technique, and thus a detailed description is omitted.

According to the above-described document retrieval system 1, it is possible to reduce the retrieval period of time using the compressed document data as the retrieval target. Specifically, the document retrieval system 1 specifies the small document group 62 including the partial character string (n-gram) extracted from the retrieval character string, and specifies the document 63 by performing index retrieval within the range of the specified small document group 62 (specifying the document ID 42 corresponding to the partial character string (n-gram) with reference to the index 40), and thus the index retrieval range is narrowed down to be smaller than when index retrieval is performed on all document data, whereby the retrieval period of time is reduced. Further, even when the index 40 is installed in association with the decompressed document group 61, the retrieval period of time is reduced to be shorter than when index retrieval is performed on all document data.

Further, since the document retrieval system 1 specifies the document group 61 to be decompressed through the group hit list 80, the document retrieval system 1 uses the compressed document data as the retrieval target and thus can save a decompression period of time of document data of the document group 61 that need not be decompressed and implement the high-speed process as a whole.

REFERENCE SIGNS LIST 1 document retrieval system
10 retrieval server
12 small group retrieving unit
14 group retrieving unit
16 document retrieving unit
20 storage device
30 n-gram hit list
40 index
50 group list
60 document database

The invention claimed is:

1. A document retrieval system, comprising:
a storage device that stores document data including a document which is divided into a plurality of document groups and compressed in association with the document groups, an index indicating a correspondence relation among a partial character string used for retrieving the document and a first identifier indicating the document, and a first correspondence table in which the document group is divided into small document groups including at least one document, and a second identifier indicating the small document group is associated with the partial character string; and
a retrieval server that retrieves, in response to an input of a retrieval character string, the second identifier corresponding to the partial character string included in the retrieval character string from the first correspondence table, decompresses the document data of the document group including the small document group indicated by the second identifier, retrieves the first identifier corresponding to the partial character string in which the second identifier is retrieved with reference to the index, acquires the document data corresponding to the retrieved first identifier from the decompressed document data, retrieves the first identifier of the document data including the retrieval character string in the acquired document data, and output the retrieved first identifier,
wherein the storage device further stores a second correspondence table in which the second identifier is associated with a third identifier indicating the document group, and
the retrieval server retrieves the third identifier corresponding to the retrieved second identifier from the second correspondence table, and specifies the document group to be decompressed based on the retrieved third identifier.

2. The document retrieval system according to claim 1, wherein the storage device stores the index in association with the small document group, and
the retrieval server retrieves the first identifier corresponding to the partial character string in which the second identifier is retrieved with reference to the index corresponding to the small document group indicated by the retrieved second identifier.

3. The document retrieval system according to claim 1, wherein the storage device stores the index in association with the document group, and
the retrieval server retrieves the first identifier corresponding to the partial character string in which the second identifier is retrieved with reference to the index corresponding to the document group indicated by the retrieved third identifier.

4. The document retrieval system according to claim 1, wherein the index further includes a storage position of the decompressed document data corresponding to the document group, and
the retrieval server outputs the storage position of the document data indicated by the retrieved first identifier in the decompressed document group as a retrieval result obtained with reference to the index.

5. A document retrieval method performed by a document retrieval system, the document retrieval system including a storage device that stores document data including a document which is divided into a plurality of document groups and compressed in association with the document groups, an index indicating a correspondence relation among a partial character string used for retrieving the document and a first identifier indicating the document, and a first correspondence table in which the document group is divided into small document groups including at least one document, and a second identifier indicating the small document group is associated with the partial character string, the document retrieval method comprising:

retrieving, in response to an input of a retrieval character string, the second identifier corresponding to the partial character string included in the retrieval character string from the first correspondence table, decompressing the document data of the document group including the small document group indicated by the second identifier, retrieving the first identifier corresponding to the partial character string in which the second identifier is retrieved with reference to the index, acquiring the document data corresponding to the retrieved first identifier from the decompressed document data, retrieving the first identifier of the document data including the retrieval character string in the acquired document data, and outputting the retrieved first identifier, wherein the storage device further stores a second correspondence table in which the second identifier is associated with a third identifier indicating the document group, and the document retrieval system retrieves the third identifier corresponding to the retrieved second identifier from the second correspondence table, and specifies the document group to be decompressed based on the retrieved third identifier.

6. The document retrieval method according to claim 5, wherein the storage device stores the index in association with the small document group, and the document retrieval system retrieves the first identifier corresponding to the partial character string in which the second identifier is retrieved with reference to the index corresponding to the small document group indicated by the retrieved second identifier.

7. The document retrieval method according to claim 5, wherein the storage device stores the index in association with the document group, and the document retrieval system retrieves the first identifier corresponding to the partial character string in which the second identifier is retrieved with reference to the index corresponding to the document group indicated by the retrieved third identifier.

8. The document retrieval method according to claim 5, wherein the index further includes a storage position of the decompressed document data corresponding to the document group, and the document retrieval system outputs the storage position of the document data indicated by the retrieved first identifier in the decompressed document group as a retrieval result obtained with reference to the index.

\* \* \* \* \*